United States Patent
Fot et al.

(10) Patent No.: US 8,250,101 B2
(45) Date of Patent: Aug. 21, 2012

(54) ONTOLOGY GUIDED REFERENCE DATA DISCOVERY

(75) Inventors: Dmitriy Fot, Almaty (KZ); Dan J. Mandelstein, Austin, TX (US); Ivan M. Milman, Austin, TX (US); Martin A. Oberhofer, Bondorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 12/789,225

(22) Filed: May 27, 2010

(65) Prior Publication Data

US 2011/0295866 A1 Dec. 1, 2011

(51) Int. Cl.
*G06F 17/00* (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

| | | |
|---|---|---|
| 7,146,399 B2 | 12/2006 | Fox et al. |
| 7,328,209 B2 | 2/2008 | Das et al. |
| 7,469,252 B2 | 12/2008 | Niemoller et al. |
| 7,505,989 B2 | 3/2009 | Gardner et al. |
| 7,657,546 B2 | 2/2010 | Goodwin et al. |
| 2007/0226246 A1 | 9/2007 | Dheap et al. |
| 2008/0077598 A1* | 3/2008 | Wilmering et al. ........... 707/100 |
| 2008/0082574 A1 | 4/2008 | Hosokawa |
| 2008/0091633 A1 | 4/2008 | Rappaport et al. |
| 2008/0243809 A1 | 10/2008 | Ranganathan et al. |
| 2009/0006315 A1 | 1/2009 | Mukherjea et al. |
| 2009/0234640 A1 | 9/2009 | Boegl et al. |

OTHER PUBLICATIONS

Sarraipa et al.;"Mentor-A Methodology for Enterprise Reference Ontology Development", IEEE Conf.on, Sep. 6-8, 2008, pp. (6-32)-(6-40).
Wang, Hai-Long; "An Ontology Mapping Algorithm for Rapid Semantic-Based Information Integration", CNMT Inter. Symp. on, Jan. 18-20, 2009, pp. 1-4.
Ni et al.; "Ontology Based Cross-Domain Enterprises Integration and Interoperability", IEEE Congress on Services Part II, Sep. 23-26, 2008, pp. 133-140.
Tanaka et al.; "Ontology Extraction from Tables on the Web", SAINT International Symposium on, Jan. 23-27, 2006, 7 Pages.
Mukherjea et al., "BioPatentMiner: An Information Retrieval System for BioMedical Patents," Proceedings of the 30th VLDB Conference, 2004: pp. 1-12, <http://www.vldb.org/conf/2004/IND3P2.PDF>.

(Continued)

*Primary Examiner* — Isaac M Woo
(74) *Attorney, Agent, or Firm* — Patterson & Sheridan, LLP

(57) ABSTRACT

Mapping and translating reference data from multiple databases using an enterprise ontology. This is achieved by various means, including mapping values of a first database to corresponding fields within the ontology, mapping values of a second database to corresponding fields within the ontology, and determining relationships between the values of the first database and the values of the second database based on their respective mappings to common fields within the ontology.

3 Claims, 6 Drawing Sheets

OTHER PUBLICATIONS

Ramakrishnan et al., "Discovering informative connection subgraphs in multi-relational graphs," ACM SIGKDD Explorations Newsletter, Dec. 2005, vol. 7(2): pp. 1-8.

Malcolm Chisholm, "Managing Reference Data in Enterprise Databases," San Diego, Academic Press 2001: p. 3 (Definition of Reference Data), <http://books.google.com/books?id=xOQW6ZpMzDIC&lpg=PP1&ots=JbFVcawesZ&dq=Chisholm%20in%20%E2%80%9CManaging%20Reference%20Data%20in%20Enterprise%20Databases&pg=PP1#v=onepage&q&f=false>.

Sean Bechhofer, "OWL Web Ontology Language Parsing OWL in RDF/XML," W3C, Jan. 2004: pp. 1-17, <http://www.w3.org/TR/2004/NOTE-owl-parsing-20040121>.

* cited by examiner

ONTOLOGY GUIDED REFERENCE DATA DISCOVERY

BACKGROUND

1. Field

The field of the disclosure is related to data discovery in a database. And more specifically, to ontology-guided reference data discovery in multiple databases with differencing reference schemas.

2. Description of the Related Art

Modern databases frequently contain a large number of tables storing an extensive amount of data. These databases may contain an equally large number of reference tables for storing reference data characterizing the other data in the database. Although two databases may contain equivalent data, the databases may contain different reference data. For instance, a first database may contain a lookup table mapping the country code "GE" to the country "Greece," where a second database may contain a lookup table mapping the country code "GR" to the country "Greece." In this scenario, data fields from the first database using the country code "GE" are equivalent to data fields from the second database using the country code "GR," as both data fields refer to the country "Greece." In other words, even though the reference values "GE" and "GR" are different, both reference values refer to the same country "Greece."

Converting an existing database to a different reference data schema is often a cumbersome task. Currently, this task is done manually and requires a user to determine associations between a first reference schema and a second reference schema. Once determined, the user must then manually create translation tables which may be used to translate reference data from the first schema to the second schema. This can be a very time consuming activity for the user, particularly in the case where the database contains a large amount of reference data. Additionally, when the user is unfamiliar with either the first schema or the second schema, or both, the task becomes just that much more difficult. Furthermore, this manual approach is also error prone, as the user must examine each and every reference table and attempt to determine relationships from one reference schema to another, often without the aid of any documentation.

SUMMARY

The present disclosure generally provides techniques for mapping reference data.

One embodiment of the invention provides a method of mapping reference data, including: mapping a first reference value from a first set of reference data to a first ontology value in an ontology. The method further includes mapping a second reference value from a second set of reference data to a second ontology value in the ontology. Additionally, the method includes determining a first association between the first ontology value and the second ontology value; and based on the determined first association, and by use of one or more computer processors, determining a second association between the first value from the first set of reference data and the second value from the second set of reference data.

Another embodiment of the invention provides a computer-readable storage medium containing a program which, when executed, performs an operation. The operation includes: mapping a first reference value from a first set of reference data to a first ontology value in an ontology. The operation further includes mapping a second reference value from a second set of reference data to a second ontology value in the ontology. Additionally, the operation includes determining a first association between the first ontology value and the second ontology value; and based on the determined first association, and by use of one or more computer processors, determining a second association between the first value from the first set of reference data and the second value from the second set of reference data.

Yet another embodiment of the invention provides a system, including: a computer processor; and a memory containing a program that, when executed on the computer processor, performs an operation for mapping reference data. The operation includes: mapping a first reference value from a first set of reference data to a first ontology value in an ontology. The operation further includes mapping a second reference value from a second set of reference data to a second ontology value in the ontology. Additionally, the operation includes determining a first association between the first ontology value and the second ontology value; and based on the determined first association, and by use of one or more computer processors, determining a second association between the first value from the first set of reference data and the second value from the second set of reference data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
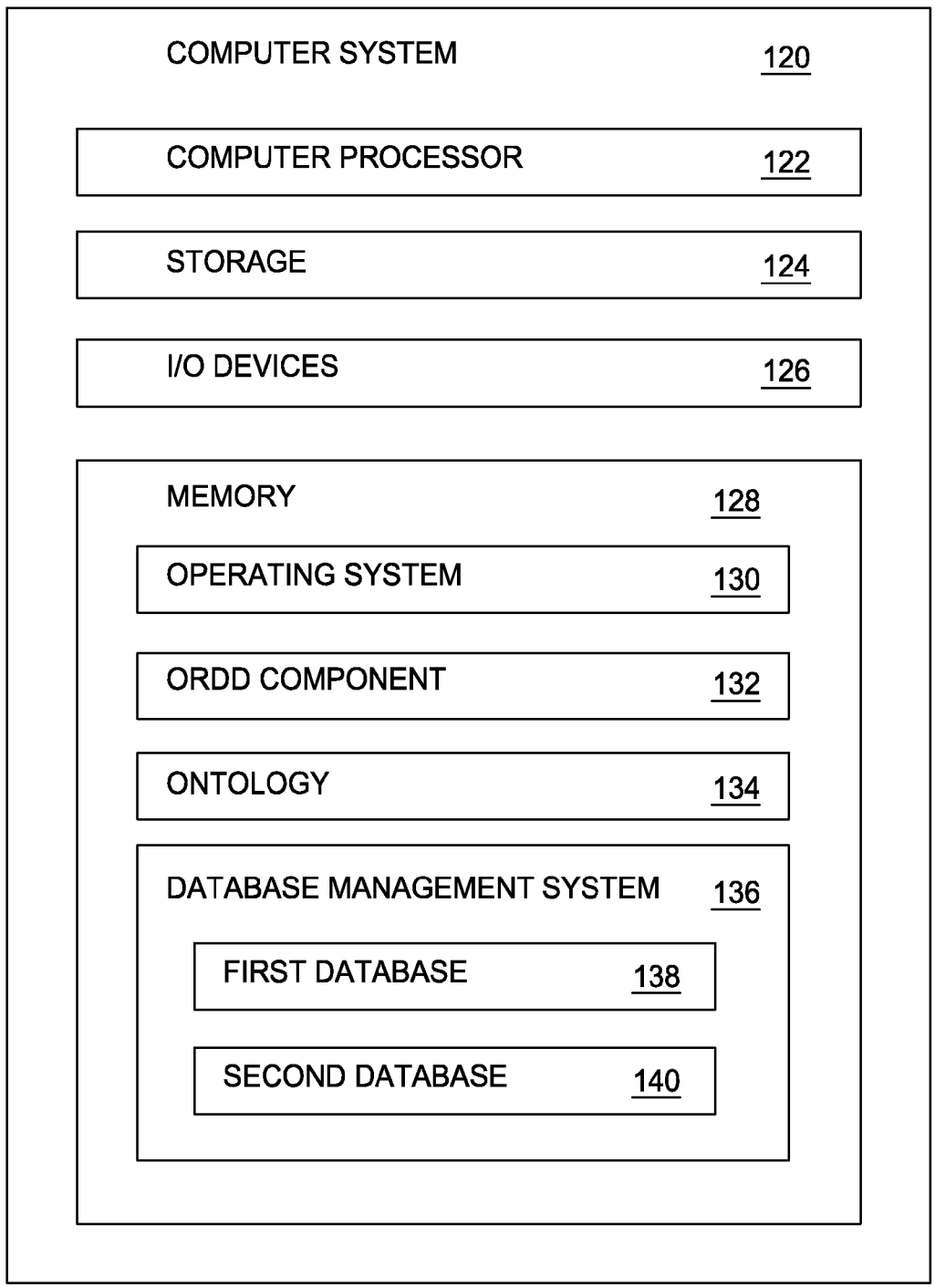
FIG. 1 is a block diagram of components of a computer system configured to run an ontology-guided reference data discovery component, according to one embodiment of the present invention.

Embodiments of the invention generally provide techniques for determining relationships between reference data from a first database and reference data in a second database. Currently, this task must be done manually, and as such it is a very time-intensive and error prone process. These costs are particularly high when the user doing the mapping is unfamiliar with the reference data schemas, or when the databases lack documentation defining the reference tables. Embodiments of the invention provide a way to normalize reference data from a first database and reference data from a second database by mapping both sets of reference data to a single ontology. Embodiments of the invention may then determine associations between the two sets of reference data based on how the sets of reference data map to the values in the ontology.

In one embodiment, an ontology-guided reference data discovery component (hereinafter ORDD component) reads in an ontology and parses a first database to identify a first set of reference data. Once the reference data is identified, the ORDD component maps the first set of reference data to values within the ontology. That is, the ORDD component normalizes the reference data in the first database to a common set of terms, values, or domains within the ontology. The ORDD component may parse a second database to identify a second set of reference data from the second database and map it to values within the ontology. Once the reference data from both databases is mapped to values from the ontology, the ORDD component may determine relationships between the first set of reference data and the second set of reference data based on their mapping to values from the ontology. Based on the determined relationships, the ORDD component may construct a translation table that may be used in translating the reference data in the first database to the equivalent values from the second database.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, this figure is a block diagram of components of a computer system configured to run an ontology-guided reference data discovery component, according to one embodiment of the present invention. As shown, computer system 120 includes computer processor(s) 122, storage media 124, one or more I/O devices 126, and system memory 128. Computer processor 122 may be any processor capable of performing the functions described herein. I/O devices 126 may represent a variety of input and output devices, including keyboards, mice, visual displays, printers and so on. Furthermore, as will be understood by one of ordinary skill in the art, any computer system capable of performing the functions described herein may be used.

In the pictured embodiment, memory 128 contains an operating system 130, an Ontology-Guided Reference Data Discovery (ORDD) component 132, an ontology 134 and a Database Management System (DBMS) 136. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The operating system 130 may be any operating system capable of performing the functions described herein.

As shown, memory 128 also contains an ontology 134. Generally, particular words used to represent semantic concepts can be structured into ontologies 134 (i.e., organizations of concepts and meanings). Typically, ontologies are created to organize meanings within a domain (i.e., field of knowledge). For example, the Unified Medical Language System (UMLS) ontology is well-known in the domain of biomedical science. In one embodiment, the ontology 134 is divided into multiple domains, with each domain representing a sub-field of knowledge from within a broader field of knowledge.

Memory 128 also contains an ORDD component 132 and a DBMS 136. As shown, DBMS 136 contains a first database 138 and a second database 140. Although in the pictured embodiment the first database 138 and second database 140 are contained in a single DBMS 136, this is not necessarily the case. In another embodiment, the first database 138 and second database 138 are contained in a first DBMS 136 and a second DBMS 136, respectively. In yet another embodiment, the first DBMS 136 and second DBMS 136 are contained on different computer systems 120. Generally, the ORDD component 132 may determine relationships between reference data in the first database 138 and reference data in the second database 140. In one embodiment, the ORDD component 132 may first identify reference data in both the first database 138 and second database 140. The ORDD component 132 may then map the identified reference data from both the first database 138 and the second database 140 to values within the ontology 134. Based on how the reference data from each database maps to the ontology 134, the ORDD component 132 may determine relationships between elements of the sets of reference data. For example, if a value A from the first database 138 maps value O in the ontology 134, and if value B from the second database 140 maps to value O in the ontology 134, the ORDD component 132 may determine an association between value A and value B because they both map to the same value within the ontology 134.

Figure 2:
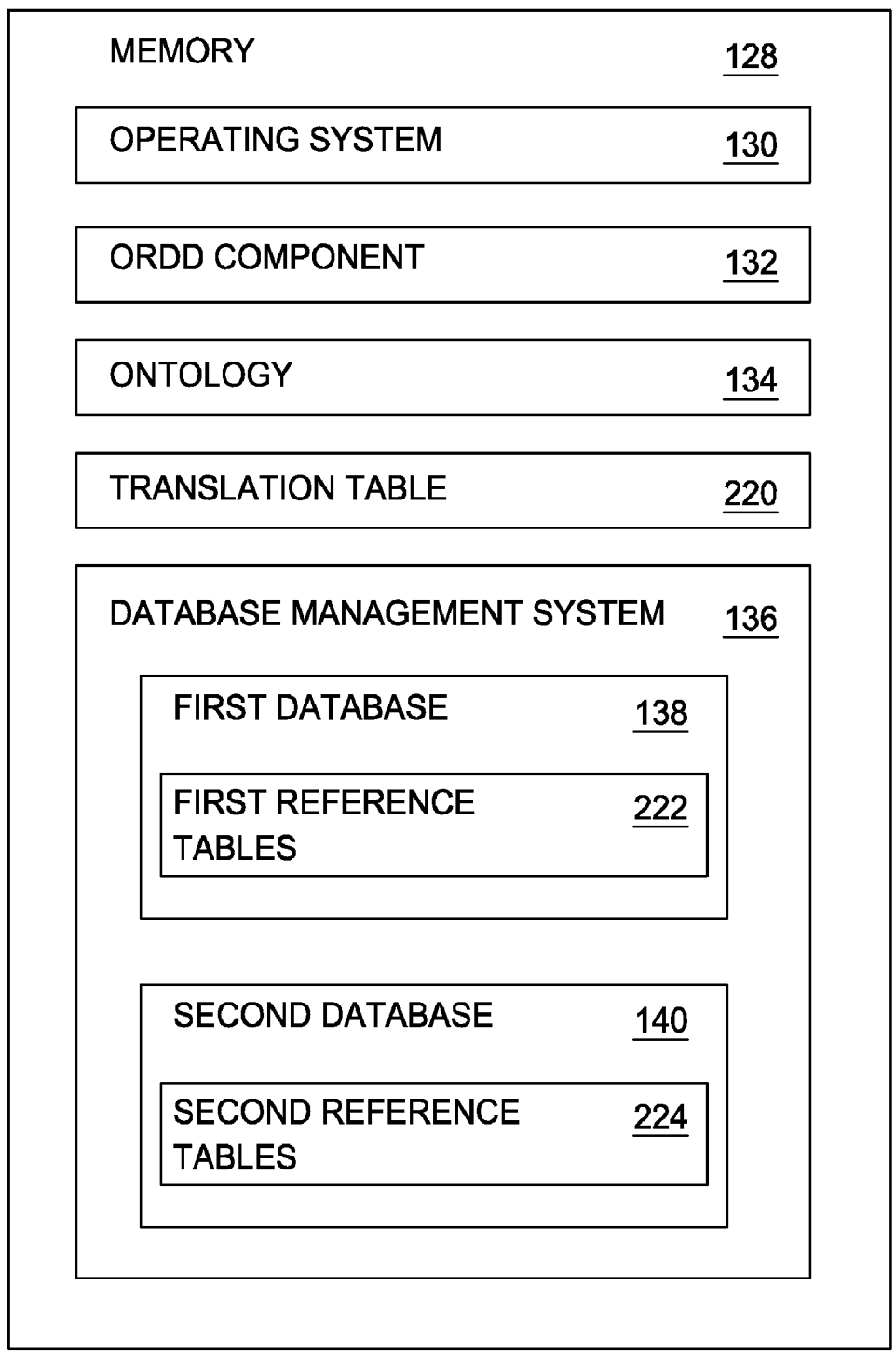
FIG. 2 is a block diagram of a computer memory of the computer system of claim 1, according to one embodiment of the invention.

FIG. 2 is a block diagram of a computer memory of the computer system of claim 1, according to one embodiment of the invention. As shown, memory 128 contains an operating system 130, an ORDD component 132, an ontology 134, a translation table 220, and a DBMS 136. The DBMS 136 contains a first database 138 and a second database 140. Although the translation table 220 and databases 138 and 140 are shown as entities residing in memory 128, it will be understood by one of ordinary skill in the art that entirety of the data for these structures may not reside in memory 128, but may be stored, in whole or in part, in other locations on computer system 120, such as on storage media 124, or on a remote computer system and may be accessed remotely over a network.

As shown, the first database 138 contains a first set of reference tables 222, and the second database 140 contains a second set of reference tables 224. Generally speaking, reference data is data used to characterize other data found in the database. Thus, for example, reference tables 222 and 224 may contain reference data, which characterizes other data found in the databases 138 and 140, respectively. Reference data is commonly used within enterprise applications to provide lists of hierarchies used for classification. Furthermore, reference data is often stored in code tables or lookup tables used by the enterprise applications. For instance, a particular database may use color codes that correspond to particular colors. For example, a database may use color code "BL" for the color "Black." However, another database may use the color code "BL" for the color "Blue," and use the color code "BK" for the color "Black." Thus, a user wishing to convert data in the first database to use the reference schema of the second database would have to first determine that the code "BL" in the first database corresponds to the code "BK" in the second database, as both codes refer to the color "Black" in their respective databases. This determination currently must be made manually by the user, and as such may often be a very error-prone process. Furthermore, for a large database containing hundreds of lookup tables with dozens or hundreds of code values each, it may take a substantial amount of time for the user to map each value to its respective value in the reference schema of the second database.

Figure 3A:
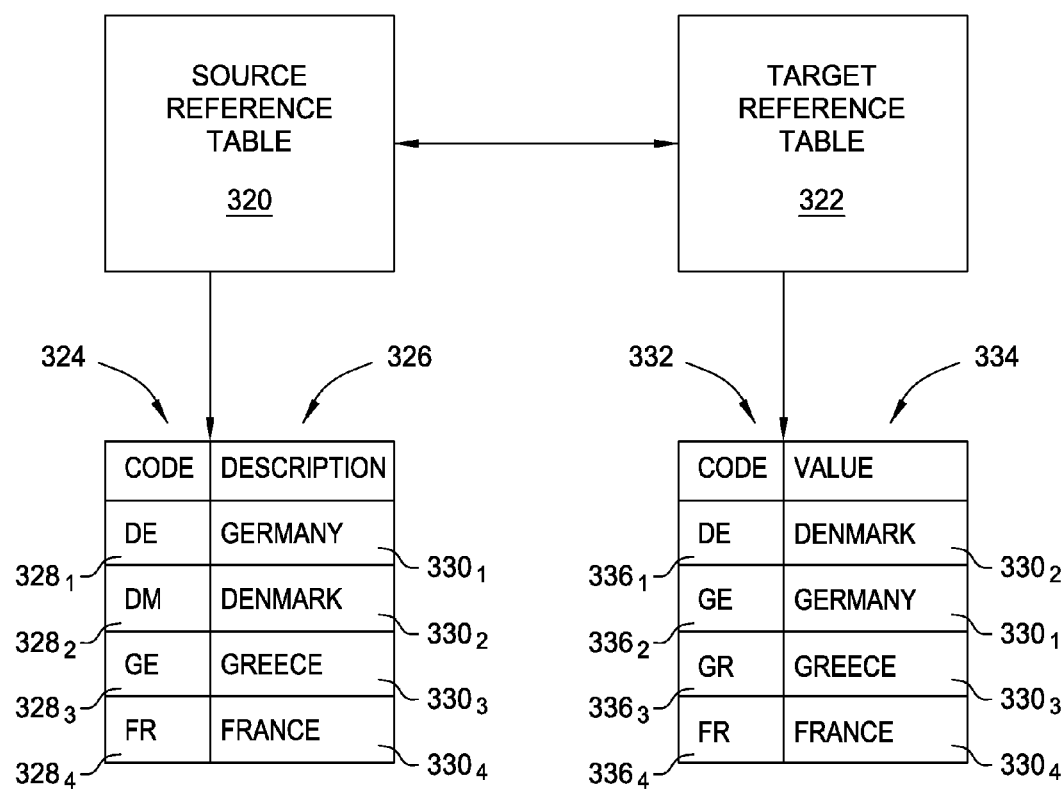
FIGS. 3A-3B illustrate example source reference tables and target reference tables, according to one embodiment of the invention.
Figure 3B:
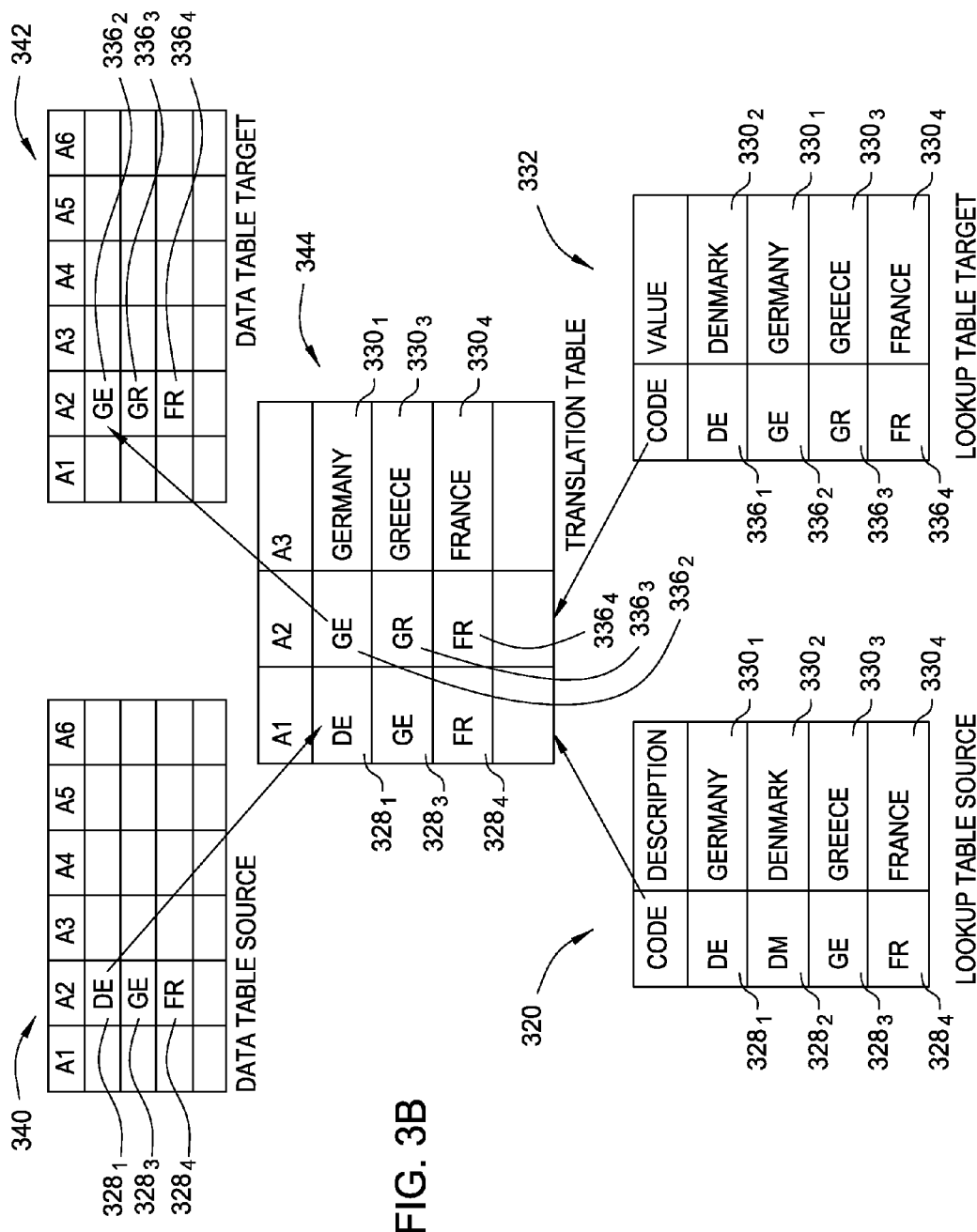

For example, FIGS. 3A-3B illustrate example source reference tables and target reference tables, according to one embodiment of the invention. FIG. 3A shows a source reference table 320 from a source database and a target reference table 322 from a target database. Specifically, both reference tables 320 and 322 include country code data, contained in columns 324 and 332, and country name data, contained in columns 326 and 334, respectively. As shown, the source table 320 contains entries mapping country code data 328 to country name data 330. For instance, in source table 320, country code "DE" $328_1$ is associated with country "Germany" $330_1$. Similarly, in the target table 322, country code "DE" $336_1$ is associated with country "Denmark" $330_2$, and code "GE" $336_2$ is associated with country "Germany" $330_1$. As such, when converting the source database to use the reference schema of the target database, all database fields in the source database referencing country code "DE" may be modified to instead reference country code "GE." In other words, the database fields will still reference the country "Germany," but the country code will be updated in order to reflect the reference schema of the target database.

FIG. 3B further illustrates this example. As shown, source data table 340 contains three data fields containing country codes "DE" $328_1$, "GE" $328_3$ and "FR" $328_4$. As shown in source lookup table 320, these country codes refer to countries "Germany" $330_1$, "Greece" $330_3$ and "France" $330_4$. One method of converting a source data table 340 to use a different reference schema is by using a translation table 344. As shown, the translation table contains a first value "DE" $328_1$ from the source data table 340, a corresponding value "GE" $336_2$ from the target lookup table 322, and a corresponding country value "Germany" $330_1$. Thus, this entry shows that "DE" $328_1$ under the first reference schema refers to the country "Germany" $330_1$, whereas "GE" is the equivalent value in the second reference schema that also refers to the country "Germany" $330_1$. Likewise, the translation table also contains a second value "GE" $328_3$ from the source data table 340, a corresponding value "GR" $336_3$ from the target lookup table 322, and a corresponding country value "Greece" $330_3$. As such, in using the translation table 344, when an ORDD component 132 encounters value "DE" $328_1$ in a source data table, the ORDD component 132 may add a data field containing "GE" $336_2$ to a target data table 342. In other words, the source data field contains country code "DE" $328_1$, which refers to country "Germany" $330_1$ under the source reference schema.

For example, the data source table 340 may be converted using the translation table 344 to produce the target data table 342. To convert the data source table 340 to use the target reference schema, when the ORDD component 132 reads in "DE" $328_1$, which refers to country "Germany" $330_1$ under the source reference schema, from the source table 340, the ORDD component 132 may insert the country code "GE" $336_2$, which refers to country "Germany" $330_1$ under the target reference schema, into the target data table 342. Thus, the data field in the target data table 342 still refers to the same country "Germany" $330_1$, but does so using the target reference schema. Likewise, target data table 342 contains two other data fields containing country codes "GR" $336_3$ and "FR" $336_4$, which, as shown in target lookup table 322, refer to countries "Greece" $330_3$ and "France" $330_4$. As such, the data in the target table 342 refers to the same three countries as the data in source table 340, but because the reference tables 320 and 322 use different reference schemas, the actual data in tables 340 and 342 differs.

Figure 4:
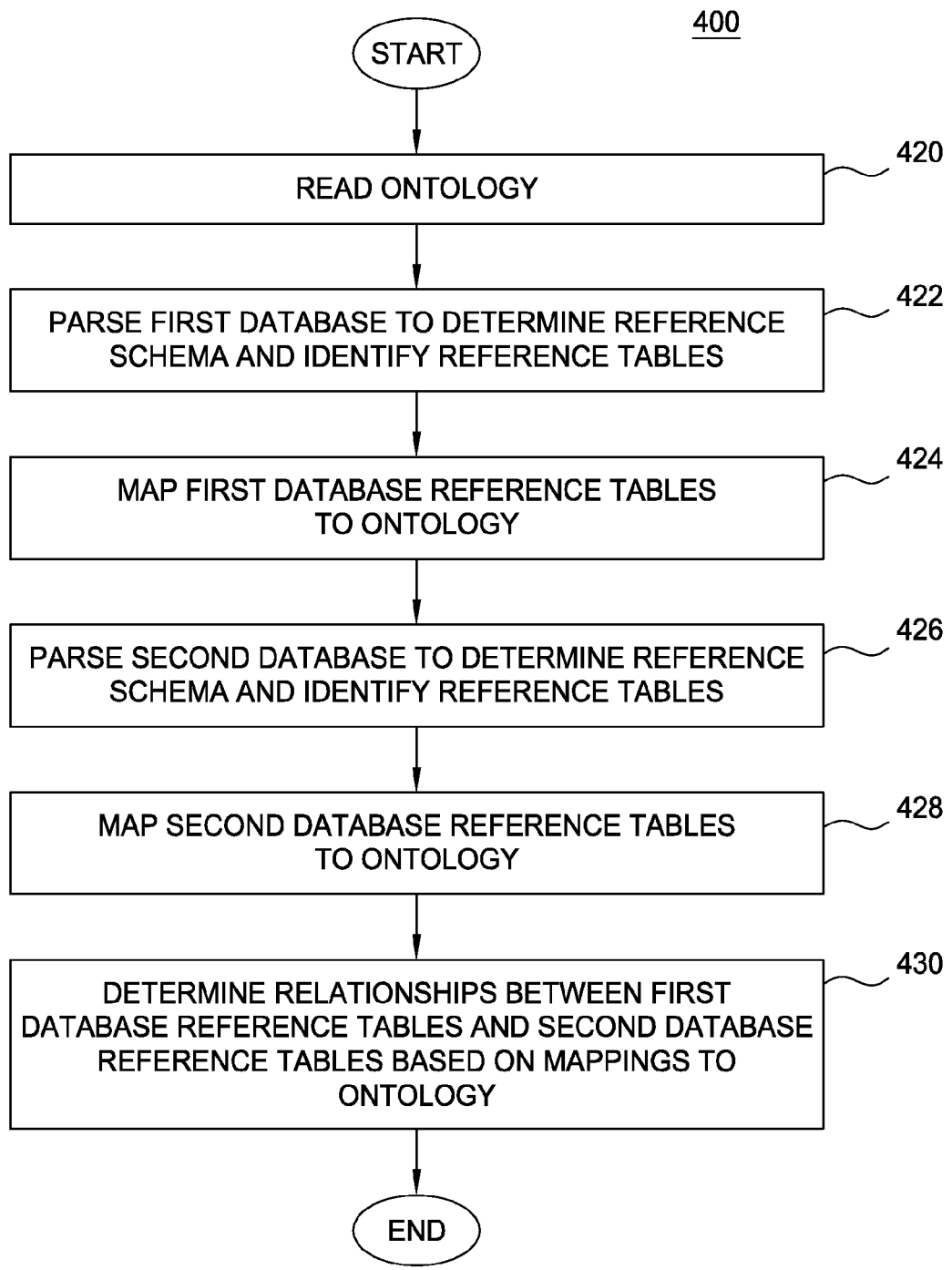
FIG. 4 is a flow diagram illustrating a method for determining associations between reference data from a first database and reference data in a second database.

FIG. 4 is a flow diagram illustrating a method for determining associations between reference data from a first database and reference data in a second database. The method 400 begins at step 420, where the ORDD component 132 reads in an ontology 134. The ORDD component 132 may parse the ontology 134 to identify domains and fields contained in the ontology 134. The ORDD component 132 then parses a first database to identify the reference tables 222 and identify the reference schema based on the values contained in the reference tables 222 (at step 422). For example, the ORDD component 132 may read in the table 320 from FIG. 3A, determine that this table is a reference table 222, and then read the values contained in the reference table 320.

In one embodiment, the ORDD component 132 may parse each table of the database and determine a size and structure of each table. The ORDD component 132 may then use this size and structure information to determine whether a particular table is a reference table. For instance, in one embodiment, the ORDD component 132 may determine that tables below a certain size are likely reference tables. In another embodiment, the ORDD component 132 may receive input specifying which tables in the database are reference tables. For instance, this information may be contained in a file associated with the database, may be specified in metadata within the database, or may be specified by a user.

Once the reference tables have been identified and read, the ORDD component 132 may map the references values to fields in the ontology 134 (at step 424). In one embodiment, this mapping is performed by calculating a maximal value partition. The ORDD component 132 may determine a value partition between a reference value and each field in the ontology. The value partition represents the similarity between the reference value and the field in the ontology.

Once the value partition has been determined for each field, the ORDD component 132 may then determine which value partition is the maximal value partition. In other words, the ORDD component 132 may determine which ontology field best matches the reference value, and then map the reference value to the determined field in the ontology.

In another embodiment, the ORDD component 132 may first identify all the various domains contained in the ontology 134. The ORDD component 132 may then map the reference values to a particular domain within the ontology 134. Once the reference data is mapped to a domain, the ORDD component 132 may then map the reference values to a particular field within the domain. Furthermore, this embodiment may be combined with the above embodiment. In such an embodiment, once the ORDD component 132 maps the reference values to a particular domain within the ontology 134, the ORDD component 132 may then calculate a value partition for each field inside the domain and determines which of the value partitions is the maximal value partition. The ORDD component 132 may then map the reference value to the ontology field corresponding to the maximal value partition. In an alternate embodiment, the ORDD component 132 may calculate a value partition for each domain in the ontology. The ORDD component 132 may then determine which domain best corresponds to the reference value by determining which of the value partitions is the maximal value partition.

At step 426, the ORDD component 132 parses a second database and identifies the reference tables contained in the second database. The ORDD component 132 then maps values from the reference tables of the second database to fields within the ontology (at step 428). As discussed above with step 424, the ORDD component 132 may perform this mapping by use of a maximal partition. In another embodiment, the ORDD component 132 may first map the reference value to a domain within the ontology.

Once the ORDD component 132 maps the reference tables 224 of the second database 140 to fields within the ontology 134, the ORDD component 132 may then determine relationships between the reference tables 222 of the first database 138 and the reference tables 224 of the second database 140 (at step 430). In one embodiment, this determination is based on a value in the first database and a value in the second database mapping to the same field within the ontology. For example, using the reference tables 320 and 322 from FIG. 3A, the ORDD component 132 may determine that column 324 maps to a "country code" field within the ontology. Similarly, the ORDD component 132 may determine that column 332 also maps to the "country code" field within the ontology. As such, the ORDD component 132 may determine a relationship between column 324 and column 332, since both columns map to the same field within the ontology. Furthermore, the ORDD component 132 may examine the other values contained in tables 320 and 322, and map specific elements from columns 324 and 332 based on their corresponding elements in columns 326 and 334. For instance, the ORDD component 132 may determine that code "DE" $328_1$ represents country "Germany" $330_1$ in reference table 320, but country "Germany" $330_1$ is represented by country code "GE" $336_2$ in reference table 322. As such, the ORDD component 132 may determine that country code "DE" $328_1$ in table 320 corresponds to country code "GE" $336_2$ in table 322.

Figure 5:
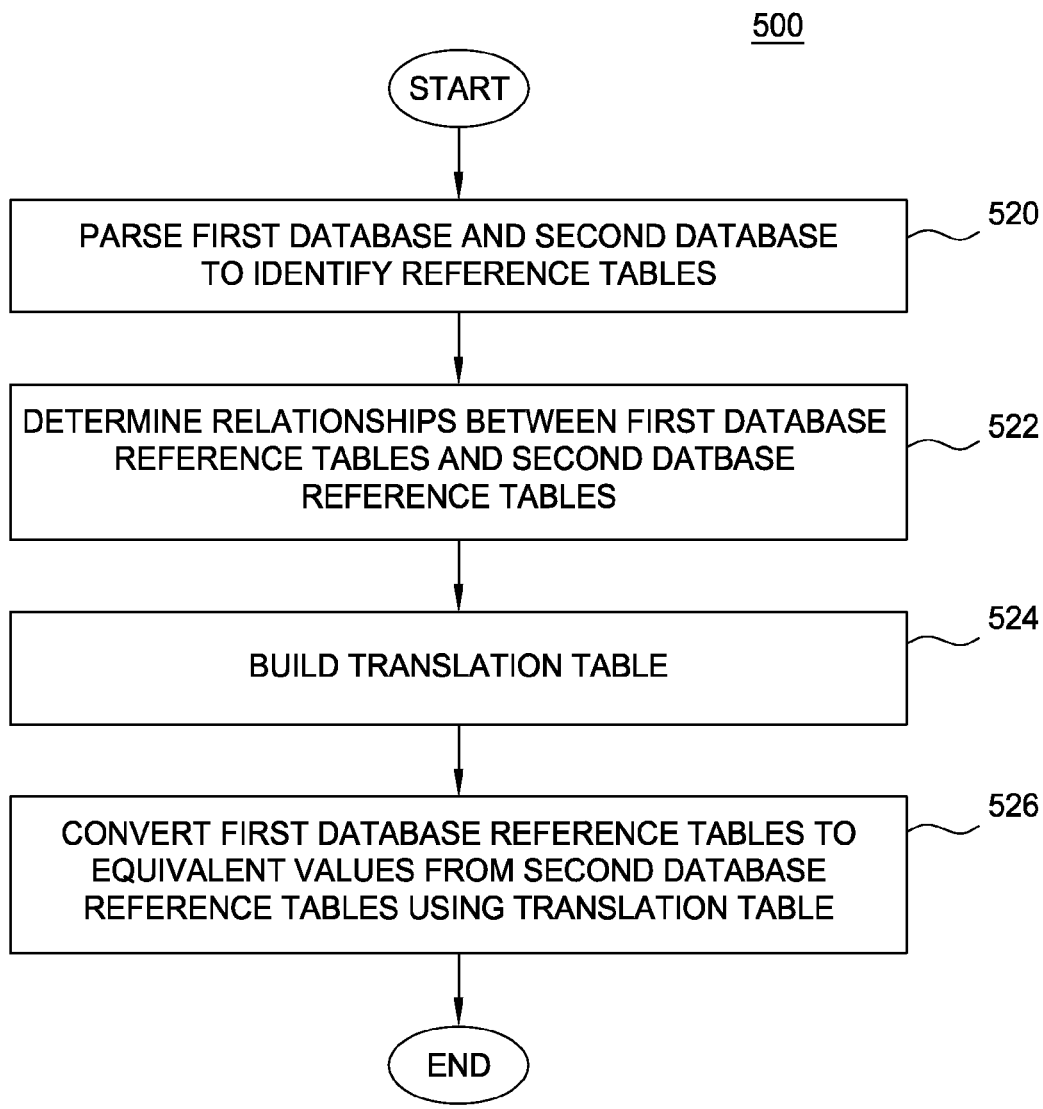
FIG. 5 is a flow diagram illustration a method for constructing a translation table mapping reference data from a first database to reference data in a second database.

FIG. 5 is a flow diagram illustration a method for constructing a translation table mapping reference data from a first database to reference data in a second database. As shown, the method 500 begins at step 520, where the ORDD component 132 parses a first database 138 and a second database 140 to identify the reference tables in each of the databases. The ORDD component 132 then determines relationships between the reference tables 222 in the first database 138 and reference tables 224 in the second database 140 (at step 522). Once the relationships between the two sets of reference tables is determined, the ORDD component 132 may build a translation table 220 for converting reference data from the first database to match the reference schema of the second database (at step 524). The ORDD component 132 may then use this translation table 220 to convert the reference tables in the first database to make use of the reference schema of the second database (at step 526).

For example, using the translation table 344 shown in FIG. 3B, if the ORDD component 132 encounters the value "DE" $328_1$ in a source table 340, the ORDD component 132 may insert the value "GE" $336_2$ into the target table 342. Likewise, if the ORDD component 132 encounters the value "GE" $328_3$ in the source table 340, the ORDD component may insert the value "GR" $336_3$ into the target table 342. In other words, once the translation table 344 is constructed (at step 524), the ORDD component 132 may parse every field of the source database 138 and translate each field that relates to the source reference tables 320 to instead relate to the corresponding value from target reference tables 322. Thus, a database using a first reference schema may be converted to use a different reference schema.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of mapping reference data, comprising:
identifying a first set of reference data, containing a first plurality of reference values, comprising:
for each table in a first database:
  determining a size of the table;
  determining whether the table is a reference table based on the determined size for the table; and
  if the table is determined to be a reference data table, adding the table to the first set of reference data;
mapping a first reference value from the first set of reference data to a first ontology value in an ontology, wherein the first reference value characterizes one or more data values in the first database;
mapping a second reference value from a second set of reference data to a second ontology value in the ontology, wherein the second reference value characterizes one or more data values in a second database;
determining a first association between the first ontology value and the second ontology value; and
based on the determined first association, and by use of one or more computer processors, determining a second association between the first reference value from the first set of reference data and the second reference value from the second set of reference data.

2. A computer-readable storage medium containing a program which, when executed, performs an operation, comprising:
identifying a first set of reference data, containing a first plurality of reference values, comprising:
for each table in a first database:
  determining a size of the table;
  determining whether the table is a reference table based on the determined size for the table; and
  if the table is determined to be a reference data table, adding the table to the first set of reference data;
mapping a first reference value from the first set of reference data to a first ontology value in an ontology, wherein the first reference value characterizes one or more data values in the first database;
mapping a second reference value from a second set of reference data to a second ontology value in the ontology, wherein the second reference value characterizes one or more data values in a second database;
determining a first association between the first ontology value and the second ontology value;
based on the determined first association, and by use of one or more computer processors, determining a second association between the first reference value from the first set of reference data and the second reference value from the second set of reference data.

3. A system, comprising:
a computer processor; and
a memory containing a program that, when executed on the computer processor, performs an operation for mapping reference data, comprising:
identifying a first set of reference data, containing a first plurality of reference values, comprising:
for each table in a first database:
  determining a size of the table;
  determining whether the table is a reference table based on the determined size for the table; and
  if the table is determined to be a reference data table, adding the table to the first set of reference data;
mapping a first reference value from the first set of reference data to a first ontology value in an ontology, wherein the first reference value characterizes one or more data values in the first database;
mapping a second reference value from a second set of reference data to a second ontology value in the ontology, wherein the second reference value characterizes one or more data values in a second database;
determining a first association between the first ontology value and the second ontology value; and
based on the determined first association, and by use of one or more computer processors, determining a second association between the first reference value from the first set of reference data and the second reference value from the second set of reference data.

* * * * *